UNITED STATES PATENT OFFICE.

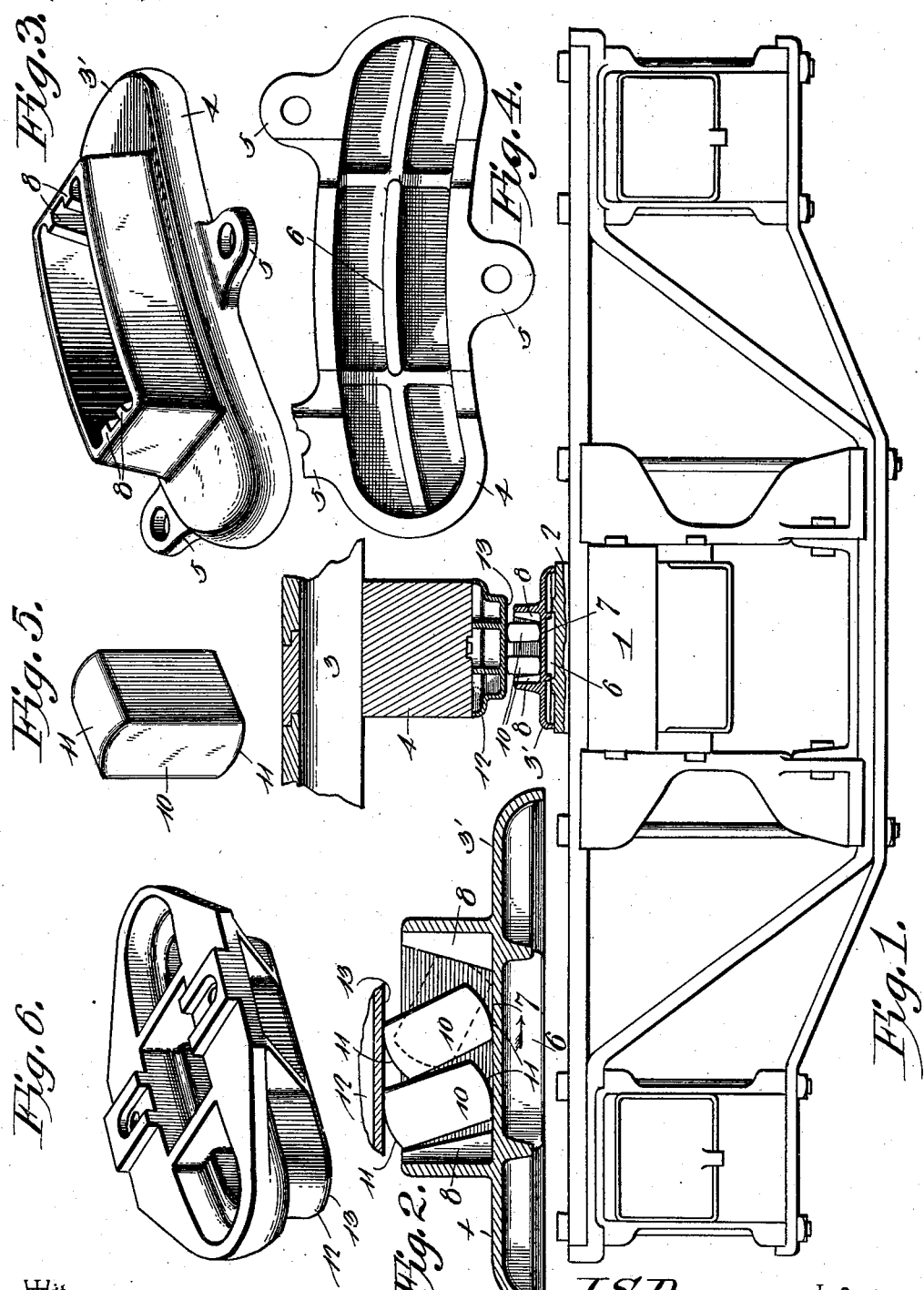

JAMES S. PEARCE, OF ROANOKE, VIRGINIA, ASSIGNOR OF ONE-FIFTH TO JAMES C. CASSELL, OF ROANOKE, VIRGINIA.

SIDE BEARING FOR TRUCKS.

SPECIFICATION forming part of Letters Patent No. 686,473, dated November 12, 1901.

Application filed August 17, 1901. Serial No. 72,423. (No model.)

*To all whom it may concern:*

Be it known that I, JAMES S. PEARCE, a citizen of the United States, residing at Roanoke, in the county of Roanoke and State of Virginia, have invented a new and useful Side Bearing for Trucks, of which the following is a specification.

My invention relates to certain improvements in side bearings for car-trucks, and has for its principal object to provide a bearing which will reduce to a minimum the friction between the truck and body bolsters of an ordinary car.

A further object of the invention is to provide a device of this character which may be attached to any bolsters without in any manner altering their construction and, further, to provide a bearing of the highest efficiency at small cost and one which may be readily renewed and repaired and will require no skilled labor in its assemblement, application, or subsequent inspection and repair.

With these and other objects in view the invention consists in the novel construction and combination of parts hereinafter described, illustrated in the accompanying drawings, and particularly pointed out in the appended claims.

In the accompanying drawings, Figure 1 is a side elevation of a portion of the frame of an ordinary form of car-truck, illustrating in section a side bearing constructed in accordance with my invention. Fig. 2 is a sectional elevation of the bearing on a somewhat larger scale, illustrating the position assumed by the rocker-block during a movement of the bolsters. Fig. 3 is a perspective view of the box or casing to be attached to the truck-bolster; Fig. 4, an inverted plan view of the same. Fig. 5 is a detached perspective view of one of the rocker-blocks. Fig. 6 is a similar view of the bearing member carried by the body-bolster.

Similar numerals of reference indicate corresponding parts throughout the various figures of the drawings.

1 designates a car-truck of any ordinary character provided with the usual bolster or transom 2, and 3 represents a portion of the body of the car provided with a bolster 4.

In a construction of railway-cars, particularly freight-cars, constructed to carry heavy loads it has been usual to provide side bearings between the central pivots of the bolsters and the ends thereof in order to evenly distribute a load throughout the length of the bolster; but such devices have heretofore been of expensive construction, requiring special preparation of the bolsters and the employment of skilled labor in the application of the bearings and in any subsequent repairs to the same. In carrying out my invention I propose to employ between the two bolsters two loose blocks arranged in a carrying box or casing of such character that the blocks cannot become displaced or jammed under any condition of use, the upper and lower bearing-surfaces of such blocks being curved, so that they may freely rock between the upper and lower bolsters, and having straight vertical sides, which by reason of their sliding contact with each other and with the ends of the casing in which they are contained will cause such blocks to reassume operative positions in the event of one or the other being slightly moved from position.

To the transom or truck-bolster 2, at each side of the car, is secured a box or casing 3, having its inner and outer walls curved on the arc of a circle, the arc of the circle having its center coincident with the pivotal center of the bolsters. The elongated base 4 of this casing is provided with perforated lugs 5 for the passage of securing-bolts, and the under portion of the base is preferably webbed, as at 6, in order to strengthen the casing without adding to its weight. The bottom 7 of the casing is perfectly flat, and at its end walls are inclined ribs 8, which reduce the available length of the bottom of the box and form side bearings for the rocker-blocks to prevent any jamming of the latter when moved. The ribs 8 afford sufficient bearing-surface for contact with the rocker-block without causing undue friction and at the same time will afford spaces between them for reception of any dirt which may enter the box and be forced by the blocks toward the ends of the casing.

In the casing are placed two blocks 10 of similar shape and size and each in the form of a substantially rectangular body, having curved bearing-surfaces 11 at top and bottom, the length of the blocks being slightly less than the width of the box or casing, so that they may work freely therein. The width of the blocks as compared with the length of the bottom 7 of the casing is such that when the blocks are in position a space will be formed between the blocks and between the blocks and the ribs; but the relative proportions are such that should either one of the blocks be depressed, as to the position shown in Fig. 2, the action of the other block in rocking between the two bolster-bearings would instantly replace it. The dotted-line position shown in Fig. 2 is, however, highly exaggerated, and the block could not assume such a position under ordinary conditions of use. This position is shown in order to illustrate the action of the end ribs and the opposite block in replacing a block which may have been temporarily moved to an inoperative position. In Fig. 6 is illustrated a casting 12, adapted to be attached to the car-bolster. This casting is provided with a flat lower face 13, which bears upon the upper curved ends of the blocks at each movement of the bolsters. In operation a movement of the truck-bolster in the direction of the arrow, Fig. 2, will cause a movement of said block to the position shown in said figure, and this movement is as great as ordinarily takes place in rounding the usual curves. If there be any excessive movement, due to a sharper curve, the blocks will slide to some extent, but will immediately reassume operative position on the reverse movement.

Owing to the simple construction of this device, repairs or renewals are readily made by unskilled labor, it being simply necessary to remove worn blocks and replace them by others, and this may be accomplished without the use of tools and without unfastening any portion of the truck frame or bolster.

The structure may be modified in a variety of ways to adapt it for use in connection with special forms of bolsters or trucks or for other purposes without departing from the spirit or sacrificing any of the advantages of the invention.

Having thus described my invention, what I claim is—

1. A device of the class specified, comprising an open-top casing having inner inclined end walls, two loose removable blocks therein, said blocks being in the form of substantially rectangular bodies having arcuate end bearing-surfaces and so proportioned, with respect to the casing, as to prevent displacement, and a flat top bearing-surface carried by the body-bolster for contact with said blocks.

2. In a device of the class specified, the combination of the casing having at its opposite ends inclined ribs, two loose rocker-blocks arranged within the casing and partially projecting above the top of the same, and a flat bearing-surface carried by the body-bolster for contact therewith.

3. In a device of the class specified, the combination of the casing having inclined end walls, two loose rocker-blocks arranged therein, said blocks having arcuate end bearing-surfaces and having straight vertical side walls adapted for sliding contact with each other and with the inclined end walls of the casing, and a flat bearing-surface carried by the body-bolster for contact with said block.

4. In a device of the class specified, the combination of the casing having a base adapted to be secured to the truck-bolster or transom, inclined ribs 8 arranged at the end walls of said casing, two loose rocker-blocks 10 having curved surfaces 11 at their upper and lower ends and having straight side walls for sliding contact with each other and with the said inclined ribs, and a body-bolster bearing member 12 having a lower flat bearing-surface for contact with said blocks.

In testimony that I claim the foregoing as my own I have hereto affixed my signature in the presence of two witnesses.

JAMES S. PEARCE.

Witnesses:
LAWRENCE S. DAVIS,
W. C. RADER.